(12) United States Patent
Kim et al.

(10) Patent No.: US 6,637,970 B1
(45) Date of Patent: Oct. 28, 2003

(54) CONNECTOR FOR PREFABRICATED STRUCTURES

(75) Inventors: Jong-Kook Kim, Kyeonggi-do (KR); Soung-Soo Lim, Seoul (KR)

(73) Assignee: Toin Environmental Design Co., Ltd., Seoul (KR)

( * ) Notice: Subject to any disclaimer, the term of this patent is extended or adjusted under 35 U.S.C. 154(b) by 0 days.

(21) Appl. No.: 10/321,599

(22) Filed: Dec. 18, 2002

(30) Foreign Application Priority Data

Nov. 9, 2002 (KR) .................................. 2002-0033539 U
Nov. 9, 2002 (KR) .................................. 2002-0033540 U

(51) Int. Cl.[7] .............................................. E04H 12/18
(52) U.S. Cl. ..................... 403/217; 403/170; 403/176; 403/180
(58) Field of Search ................................ 403/167, 170, 403/171, 172, 173, 174, 176, 177, 178, 217, 218, 219, 180, 182, 181

(56) References Cited

U.S. PATENT DOCUMENTS 3,632,147 A * 1/1972 Finger ........................ 403/171
5,918,998 A * 7/1999 Pourmand ................... 403/218
2002/0110411 A1 * 8/2002 Chen ........................... 403/217

FOREIGN PATENT DOCUMENTS

KR  20-0234930  6/2001
KR  20-0234977  6/2001

* cited by examiner

Primary Examiner—Lynne H. Browne
Assistant Examiner—John Cottingham
(74) Attorney, Agent, or Firm—Burns, Doane, Swecker & Mathis, LLP

(57) ABSTRACT

Disclosed is a connector for prefabricated structures, including a first connector which consists of a central connecting part and six unit members with two tetrahedral connecting parts mutually bound; a second connector which consists of a base connected to the central connecting part or the tetrahedral connecting parts from the first connector; a supporting rod formed in a unit on the base, a connecting part and a lamp support part formed in an unit on the supporting rod. It thereof allows us to build a structure by consecutively connecting a plurality of different truss members in various angles.

11 Claims, 11 Drawing Sheets

US 6,637,970 B1

CONNECTOR FOR PREFABRICATED STRUCTURES

This application claims the priority of Korean Patent Application Nos. 2002-33539 and 2002-33540, filed Nov. 9, 2002, in the Korean Intellectual Property Office, the disclosure of which is incorporated herein in its entirety by reference.

BACKGROUND OF THE INVENTION

1. Field of the Invention

The present invention relates to a connector for prefabricated structures. More particularly, when establishing a prefabricated structure, it relates to a connector for prefabricated structures to connect consecutively and joint different kinds of members for the connector for prefabricated structures in various angles.

2. Description of the Related Art

Generally, a prefabricated structure means an assembled one, such as a performance, an exhibition, an advertising tower and a plastic art, by mutually jointing a plurality of members (hereinafter, referred to as "truss members").

In most cases, this prefabricated structure consists of light and durable aluminum material.

This prefabricated structure is equipped with square or spherical connectors which are connected with a plurality of truss members, as shown in Korean Patent Registration No. 234930 (Application No.: 20-2001-0007933, Application date: Mar. 22, 2001) or Korean Patent Registration No. 234977 (Application No.: 20-2001-0009461, Application date: Apr. 04, 2001) which the present applicant filed for a patent and got its patent registration decided to be kept.

However, a lot of restrictions follow in making a prefabricated structure as this connector forms jointed phases only to hexahedral phases, that is, six directions (X, −X, Y, −Y, Z, −Z) and the predetermined materials connected to this connector are jointed only to the direction of right angles.

SUMMARY OF THE INVENTION

The object of present invention devised for solving a problem of the mentioned conventional art is to provide a connector for prefabricated structures to equip different truss members at the various angles over the first connector by means of the second connector and to joint one another after consecutively connecting them by mutually joining the unit members with three jointed phases for making the first connector and by equipping the second connector to be jointed to the first connector.

To achieve the above object, there is provided a connector for prefabricated structures including: a first connector having a central connecting part and six unit members with two tetrahedral connecting parts mutually bound; a second connector including a base connected to the central connecting part or the tetrahedral connecting parts from the first connector; a supporting rod formed in one unit on the base and a connecting part and a lamp support part formed in one unit on the supporting rod.

It thereof allows us to build a structure freely by consecutively connecting a plurality of different truss members in various angles.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
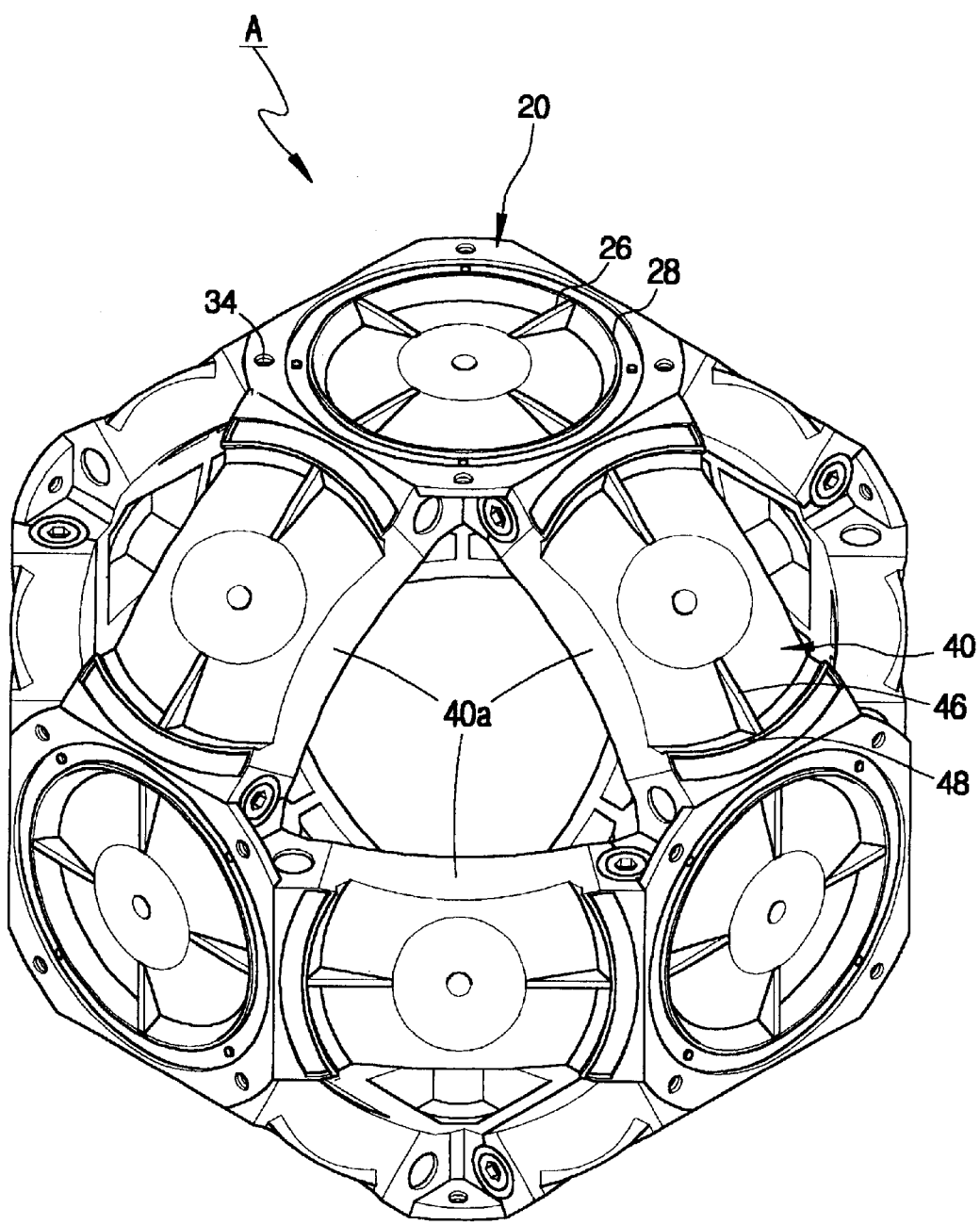
FIG. 1 is a perspective view illustrating the first connector of the connectors for prefabricated structures in accordance with the present invention.
Figure 2:
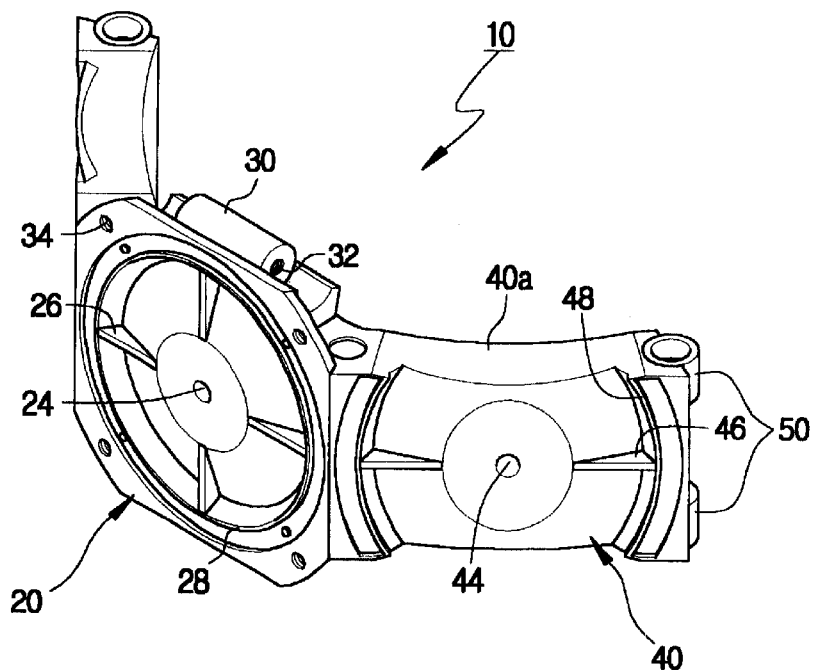
FIG. 2 is a front perspective view and a front view of the unit members which consist of the first connector in accordance with the present invention.
Figure 2:
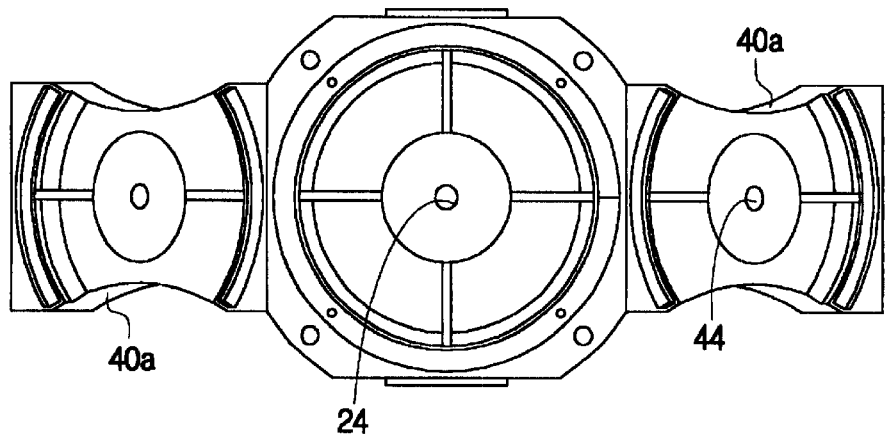
Figure 3:
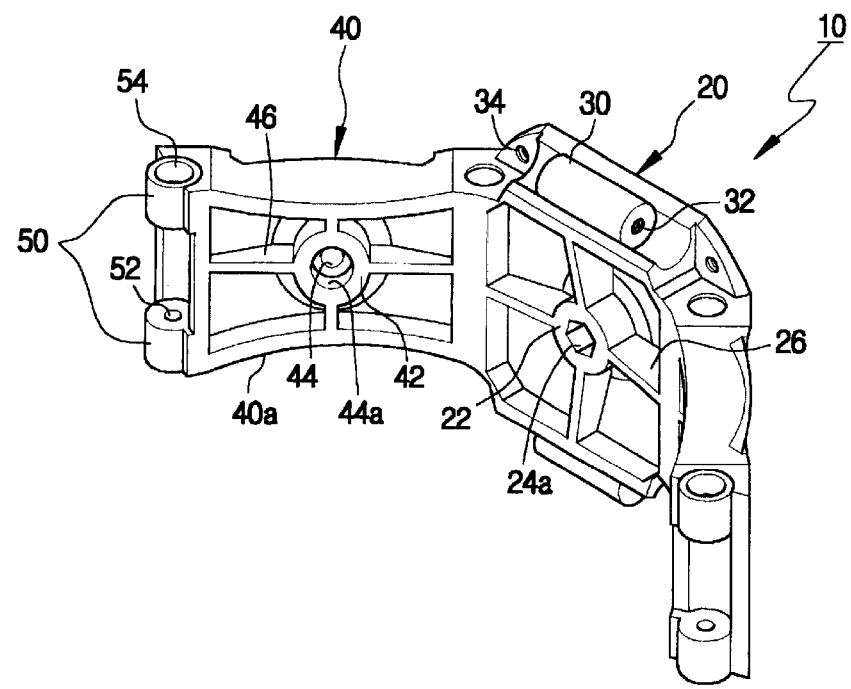
FIG. 3 is a back perspective view and back view of the unit members which consist of the first connector in accordance with the present invention.
Figure 3:
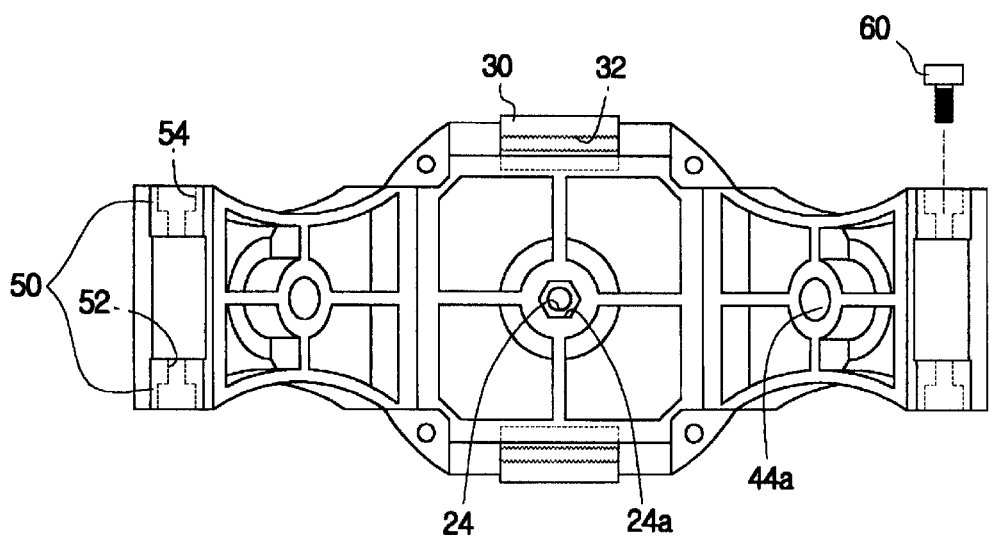
Figure 4:
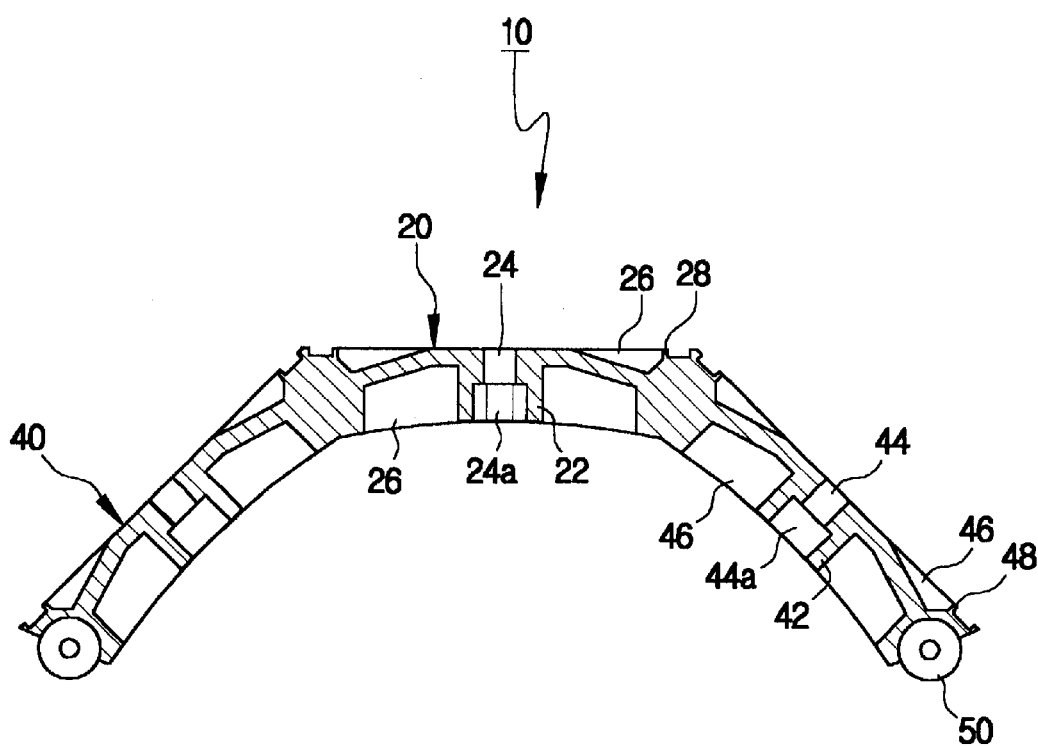
FIG. 4 is a side cross section illustrating the unit members of the first connector in accordance with the present invention.
Figure 5:
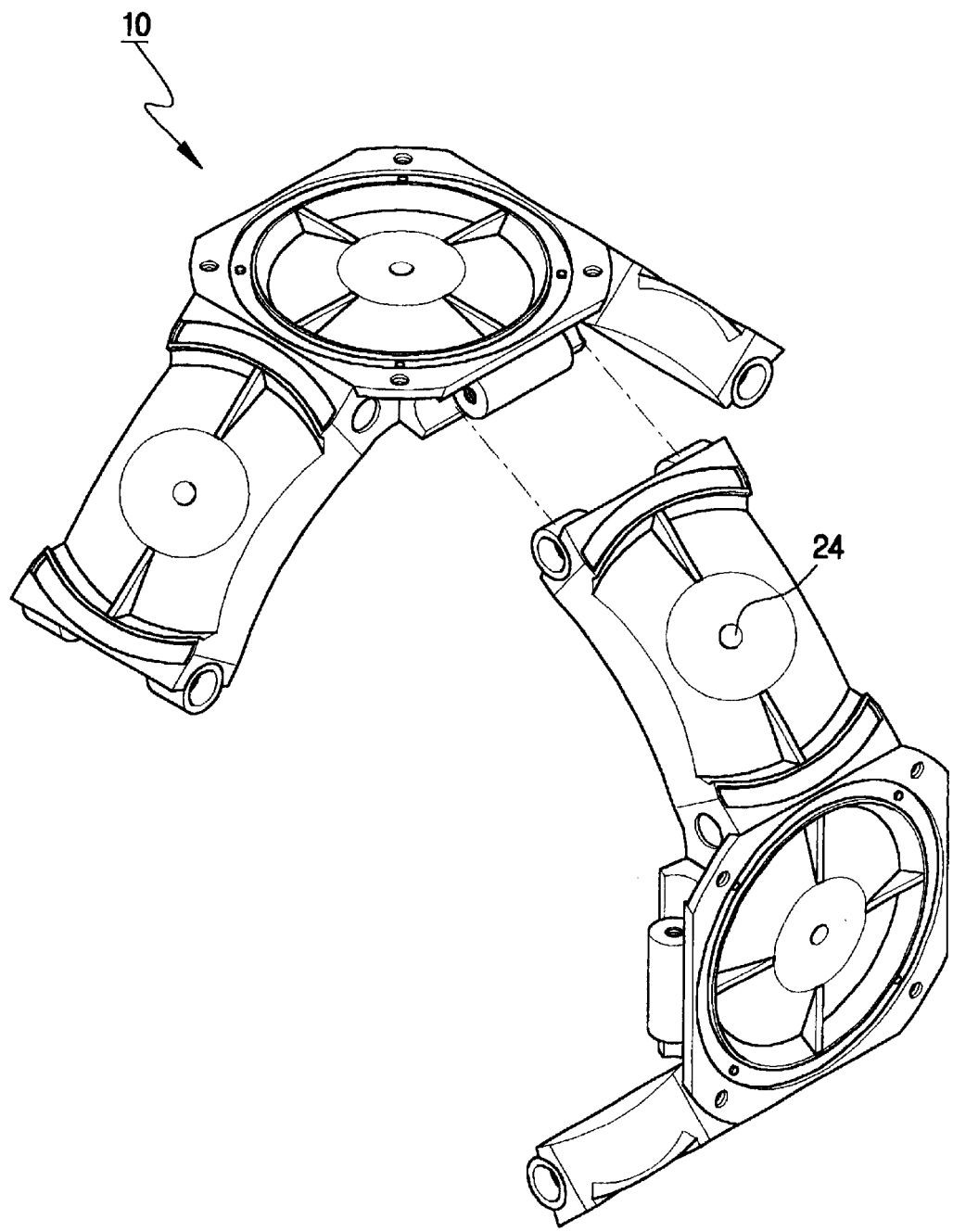
FIG. 5 is a separation view illustrating the coupled state between the unit members which consist of the first connector in accordance with the present invention.

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 to FIG. 11 illustrate a connector for prefabricated structures in accordance with the present invention.

As illustrated in the above, the connector for prefabricated structures is largely divided into a first connector A and a second connector B.

Above all, when explaining the first connector A with reference to FIG. 1 or FIG. 5 and FIG. 9 or FIG. 11, the first connector A includes six unit members 10 with three jointed phases jointed one another at right angles.

The unit members 10 include a central connecting part 20 and two tetrahedral connecting parts 40. The tetrahedral connecting parts 40 are formed in a unit roughly at 45° angles, facing both sides of the central connecting part 20.

The central connecting part 20 and the tetrahedral connecting part 40 are stepped to joint some phases of them to the second connector B and caved thereof, and the boss parts 22, 42 with bored coupling holes 24, 44 in the central part are formed as protruded to the other surfaces of the central connecting part 20 and tetrahedral connecting part 40.

Besides, both of other ends of the central connecting part 20, that is, both ends on the orthogonal direction to the tetrahedral connecting part 40 formed in the central connecting part 20, have a hinge part 30 in a unit with a punched screw bore 32, and one end of the tetrahedral connecting part 40 corresponding to the hinge part 30 has a plural hinge parts 50 in a unit with a punched insertion hole 52 where a bolt 60 is inserted.

The hinge parts 50 are separated as a corresponding width, to the hinge part 30 of the central connecting part 20 and formed in both sides of the hinge part 30 of the central connecting part 20.

One end close to the center of the first connector A, that is, coupling holes 24, 44 of the boss parts 22, 42 formed in the central connecting part 20 and the tetrahedral connecting part 40, and an external end, that is, one end of insertion hole 52 of the hinge part 50 formed in the tetrahedral connecting part 40, have expanded holes 24a, 44a, 54a, which have bigger diameters than those of coupling holes 24, 44 and insertion hole 52, to occupy the inner space of the first connector A as much as possible by accepting the head of a bolt 200, 60 to the expanded holes 24a, 44a, 54a.

At this time, it is desirable for the bolts 200, 60 to have a wrench bolt with a shape of a circular cylinder in the head.

And in the expanded hole 24a in the central connecting part, the round head of the bolt 200 is inserted to be able to rotate, and a nut 210 is formed into a polygon to be inserted not to be able to rotate. More desirably, the expanded hole 24a should be formed into a hexagon as the nut 210 is formed into a hexagon, and the expanded hole 44a of the tetrahedral connecting part 40 should be formed into a circle.

In connecting between the first connector A, it is to have the bolt 200 inserted into the expanded hole 24a of the first connector in one side and the nut 210 inserted into the expanded hole 24a of the first connector in the opposite side and fixed not to be able to rotate for the bolt 200 to be screwed with ease to the nut 210 inserted not to be able to rotate in the expanded hole 24a.

In order to reinforce rigidity of unit members 10, a plurality of bead parts 26, 46 are formed over the external phases of the boss parts 22, 42 in the central connecting part 20 and the tetrahedral connecting part 40 and over the connecting parts 20, 40 opposite to the boss parts 22, 42.

The bead parts 26, 46 are separated at intervals of 90 degrees to make a form of "+". When they are jointed to the second connector B in addition to reinforcement of rigidity of unit members 10, they will fix the position of the second connector B temporarily to make it easy to be jointed.

Besides, on the external ends of a plurality of bead parts 26, 46, a circular protrusion 28 and a circular arc protrusion 48 for connecting a plurality of bead parts 26, 46 are formed on the opposite phases of the boss parts 22, 42, that is, the central connecting part 20 and the tetrahedral connecting part 40.

As described in the above, a circular protrusion 28 and a circular arc protrusion 48 have the same functions with the bead parts 26, 46. In other word, they reinforce the rigidity of unit members 10 along with the bead parts 26, 46, and when connected to the second connector B, they will fix the second connector B on unit members 10 temporarily to make it easy to be jointed.

Particularly, the bead parts 26, 46 play a key role in fixing the position of the second connector B on unit members 10, and a circular protrusion 28 and the circular arc protrusion 48 play a key role in preventing the second connector from floating.

And the projected part 120 of the second connector B is inscribed in the internal phases of a circular protrusion 28 and a circular arc protrusion 48 to prevent the second connector B from floating over the first connector A.

Figure 10:
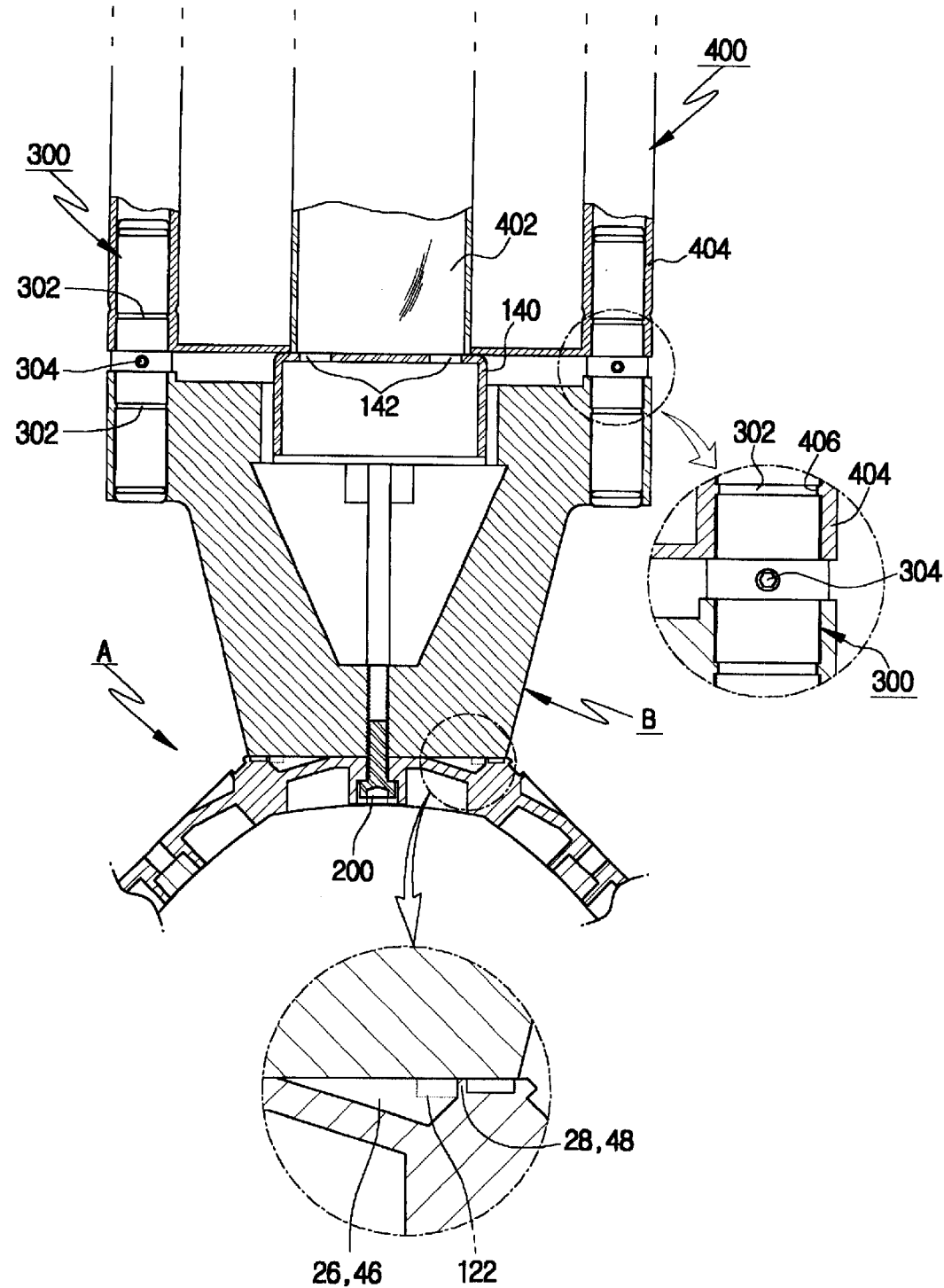

Particularly, a circle of dotted line from the magnified drawings in the lower part of FIG. 10 illustrates recesses 122 formed in the projected part 120 of the second connector B, but considering that the recesses 122 is created with the thickness of the projected part 120 being cut, it can be understood that the projected part 120 is inscribed on a circular protrusion 28 and a circular arc protrusion 48.

On the other hand, a finishing tap hole 34 is formed on the corner of the central connecting part 20 to have a screen of the finished materials of prefabricated structures such as glass or acryl plates installed.

Both ends of the tetrahedral connecting part 40 create a curved unit 40a, by being gently curved to the boss part 42 in the center, for workers' hands or tools to reach inside the first connector A.

Accordingly, the first connector A is formed to have 18 sides of jointed phases by having six unit members 10 jointed vertically one another.

Figure 6:
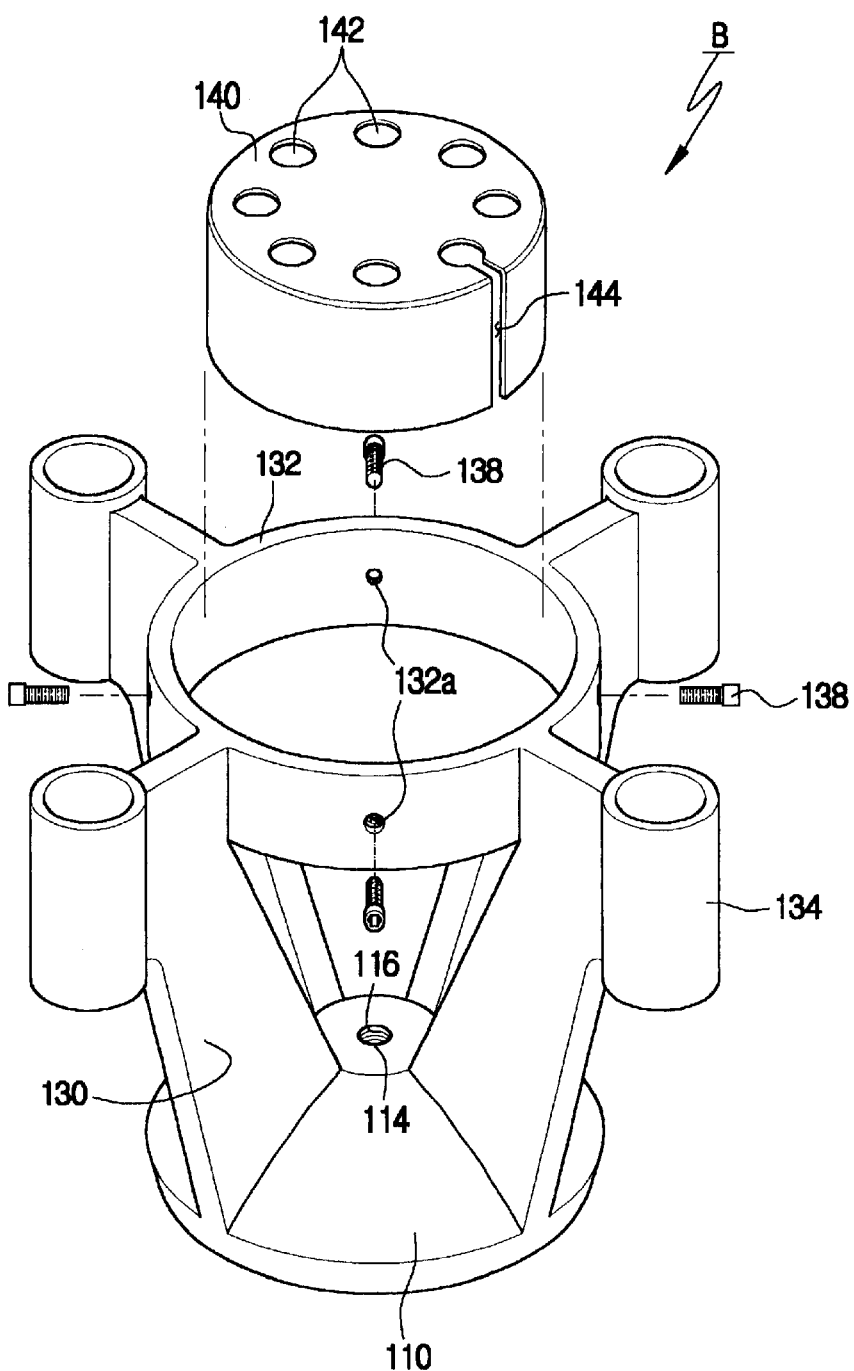
FIG. 6 is a plane perspective view illustrating the second connector of the connectors for prefabricated structures in accordance with the present invention.
Figure 7:
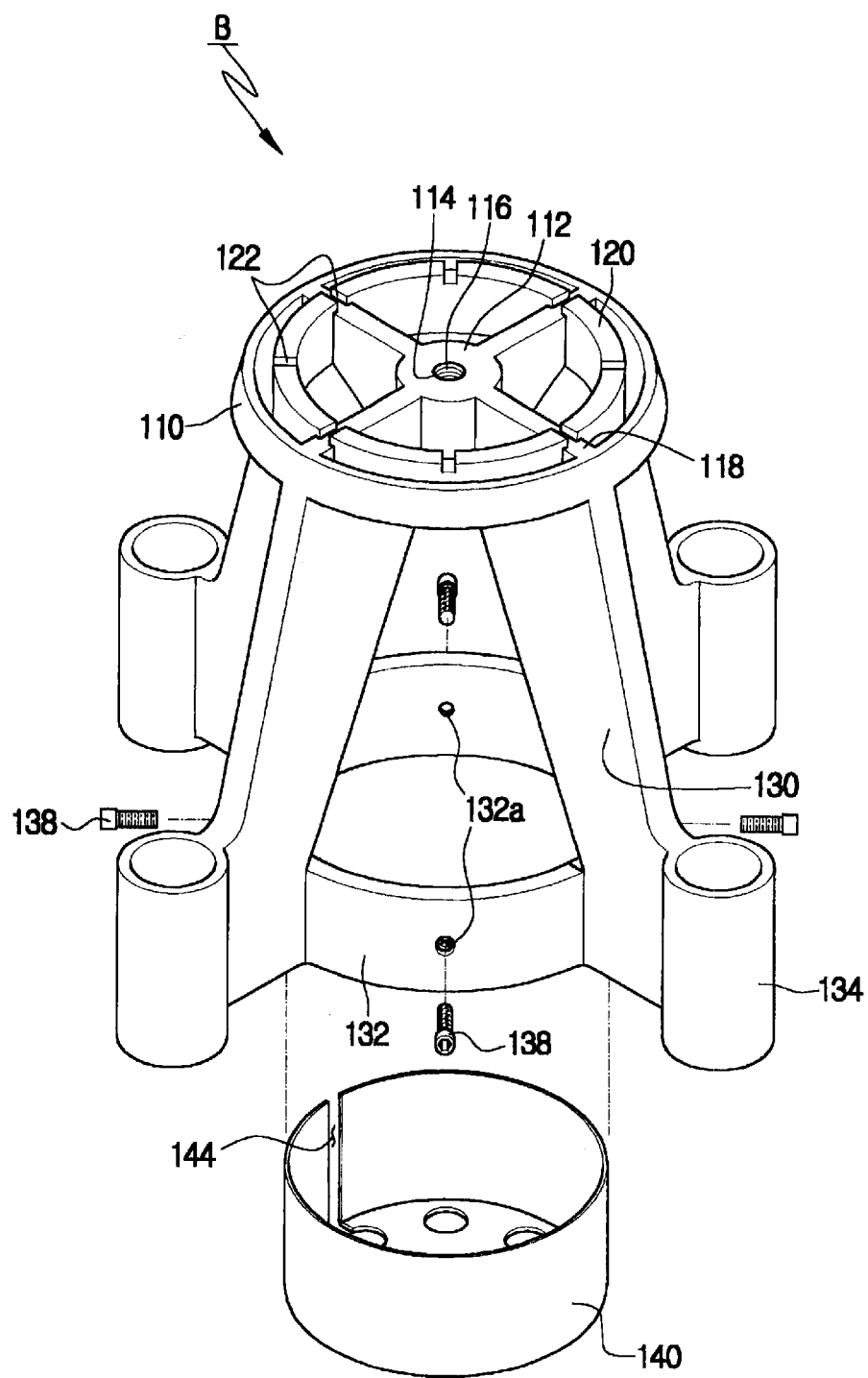
FIG. 7 is an undersurface perspective view of the unit members which consist of the second connector in accordance with the present invention.
Figure 8:
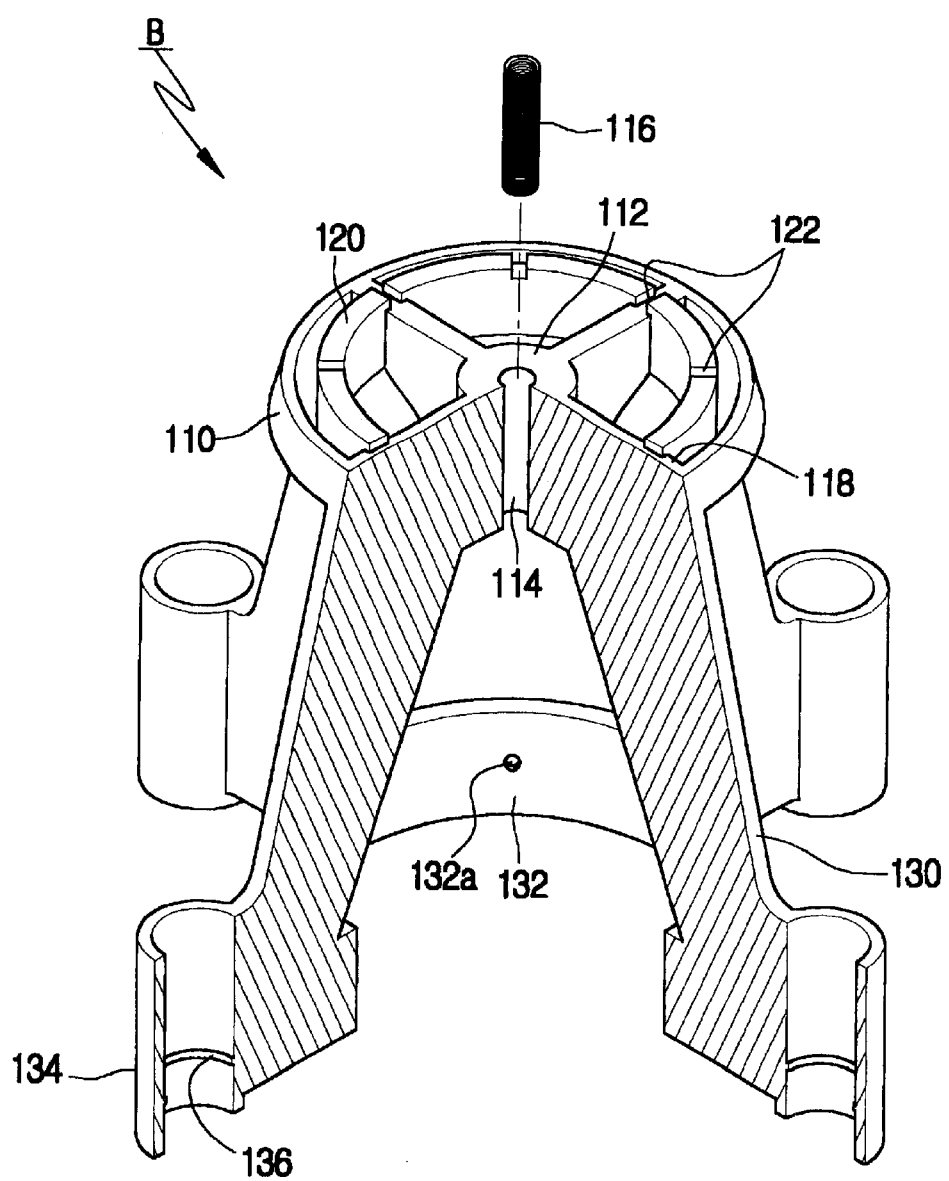
FIG. 8 is a part of dissected cross section of the unit members which consist of the second connector in accordance with the present invention.

On the other hand, as far as the second connector to be connected to the first connector is concerned, with reference to FIG. 6 to FIG. 1, it is divided into base 110, support rod 130, connecting part 134, lamp support part 132 and support member 140.

The base 110 of the second connector B is formed as a circular plate. The center of the base 110 has the coupling part 112 of the circular cylinder which has a coupling hole 114 corresponding to the coupling holes 24, 44 of the first connector A.

In addition, the coupling hole 114 of the coupling part 112 has a helical coil 116 built in it to have a strong assembly power of screw. It is to prevent the screw of the second connector B from being damaged, followed by frequent assembly and disassembly of a structure, and to have a firm assembly power of screw, as the components of the first and second connectors A, B, which consist of a structure, are composed of aluminum to make their weight light.

And between the external phase of the coupling part 112 and the internal phase of the base 110, a lot of seating parts 118 which connect them are protruded by being separated from one another at equal intervals. On these seating parts 118 have a circular protrusion 28 and a circular arc protrusion 48 of the first connector A safely assembled.

On the other hand, though this preferred embodiment illustrates that the above-described seating parts 118 consists of four seating parts 118 separated at intervals of 90 degrees, its intervals and number can be changed at any time by.those skilled in the art.

One side of the seating parts 118 has projected part 120 to the circumference to be inscribed to a circular protrusion 28 and a circular arc protrusion 48 of the first connector A. This projected part 120 is protruded higher than the coupling part 112 and the seating parts 118.

On the projected part 120, a lot of recesses 122 are cut by being separated at equal intervals for the bead parts 26, 46 of the first connector A to be inserted and fixed into it.

This preferred embodiment describes that, for an example, eight recesses 122 are made by being separated at equal intervals of 45 degrees, but they aren't limited to eight recesses.

On the opposite side of the base 110 has a support rod 130 whose phase is steep toward the outside and separated at equal intervals of 90 degrees On the external surface of one end of the support rod 130, a connecting part 134 consisting of a pipe with empty center is created in a unit, and on its internal phase, a holding protrusion 136 is protruded to be locked a joint member 300 inserted into the connecting part 134.

Figure 9:
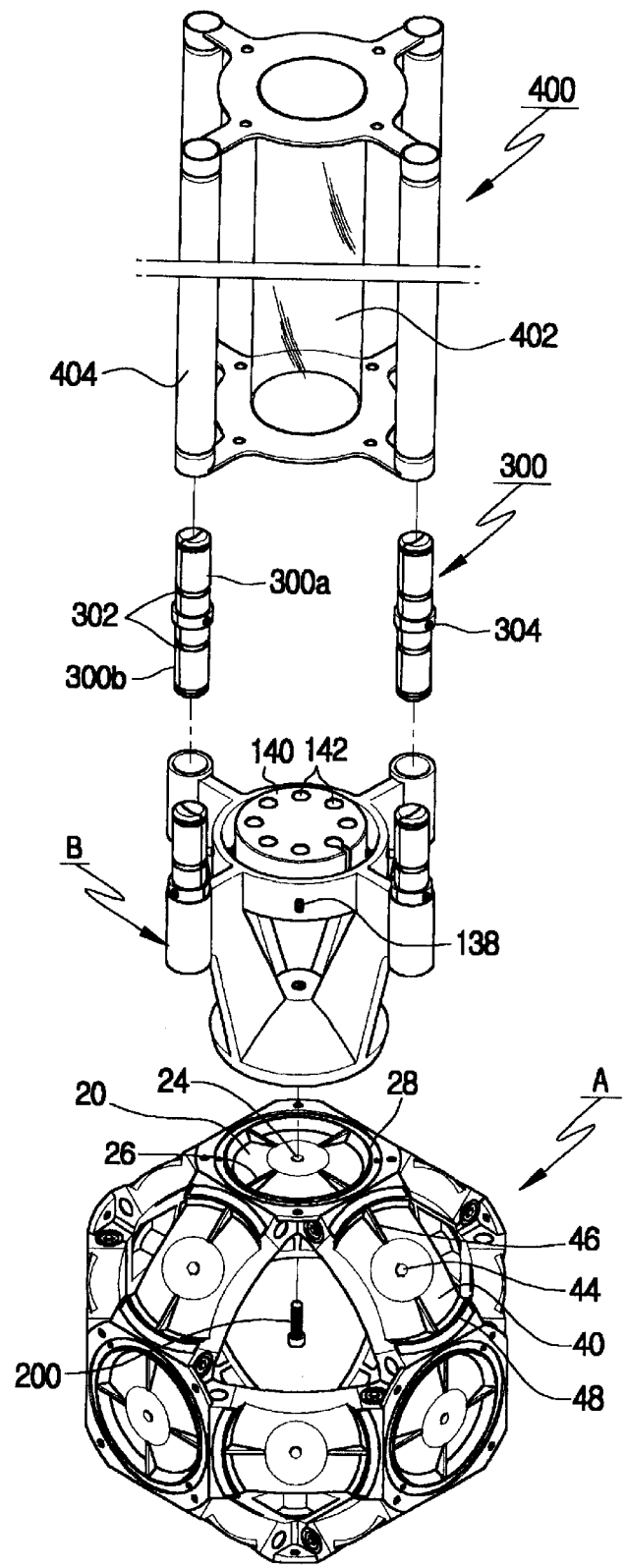
FIG. 9 and FIG. 10 are a separate perspective view and a coupled cross section illustrating the state in which the first and second connectors of the present invention are coupled.

To describe the joint member 300 briefly with reference to FIG. 9 and FIG. 10, the joint member 300 is arranged with separated caps 300a, 300b on both sides put together.

In the center of the cap 330a on the joint member 300, an adjusting bolt 304 is assembled with a screw and its end is jointed to the inside of the cap 300b on the opposite side to allow both caps 300a, 300b to open or shut by tightening or untightening the adjusting bolt 304.

On both ends of the external phases of both caps 300a, 300b consisting of the joint member 300, holding groove 302 corresponding to the holding protrusion 136 of the connecting part 134 are created.

At this time, when both caps shut and their diameter are completely reduced, the external diameter of the joint member 300 is designed to be smaller than that of the connecting part 134.

On the other hand, a ring-type of lamp support part 132 is created on the internal phase of one end of each support rod 130, as it is formed in a unit to touch its external phase, to support a light means(not illustrated).

On the external phase of the lamp support part 132, screw bores 132a are created by being separated at intervals of 90 degrees. These screw bores 132a have a bolt 138 assembled into them.

In addition, the lamp support part 132 has support member 140 inserted into it, disclosing that one of its phases is open.

The support member 140 is inserted into the lamp support part 132 for the opening of the support member 140 to face the base 110, and it is pressed to be fixed, separated from the internal phase of the lamp support part 132 by means of the bolt 138 assembled with a screw into the lamp support part 132.

On the opposite phase of the opening, that is, on one phase of the support member 140, a plurality of radiators 142 are bored by being separated to the direction of circular cylinder for heat from light to radiate.

A cutting part 144 is made from the radiator 142 to the opening of the support member 140 to draw and wire plugs or electric lines of the light means easily.

A connector for prefabricated structures of the present invention as described in the above is built as a structure by being connected to the rest of truss members 400, including the first connector A and the second connector B, after being assembled to the first connector A.

In assembling the first connector A, it assembles vertically six unit members 10 consisting of the two tetrahedral connecting part 40 formed in a unit on both ends of the central connecting part 20.

To make more details of it, it arranges and puts hinge part 50s, which are created in the tetrahedral connecting part 40 of different unit members 10, on the same line to one side of the hinge part 30 created in the central connecting part 20 of the unit members 10.

And a bolt 60 is inserted successively into an expanded hole 54 and an insertion hole 52 bored in the hinge part 50 of the tetrahedral connecting part 40, and assembled with a screw into the screw bore 32 bored in the hinge part 30 of the central connecting part 20 to joint both the central connecting part 20 and the tetrahedral connecting part 40.

At this time, the bolt 60 is a wrench bolt. Its head is not protruded by being completely inserted into the expanded hole 54 of the tetrahedral connecting part 40. So it can avoid interference with peripheral components and maximize the internal space of the first connector A.

And a hinge part 50 created in the tetrahedral connecting part 40 of another unit members 10 is connected to the other hinge part 30 of the central connecting part 20 of the basic unit members 10 in the same way as described in the above.

Accordingly, if the rest of unit members 10 are jointed successively in the same way as described in the above, it will create a first connector A which consists of six central connecting parts 20 and twelve tetrahedral connecting parts 40.

On the other hand, as illustrated in FIG. 9 and FIG. 10, the first connector A assembled in the above is connected to the second connector B.

To make more details of it, the bead parts 26, 46 of the central and tetrahedral connecting parts 20, 40 in the first connector are inserted into the recesses 122 formed as cut on the projected part 120 of the base 110 consisting of the second connector.

And a circular protrusion 28 and a circular arc protrusion 48 are safely fixed on the seating parts 118 of the base 110, and the projected part 120 of the base 110 is inscribed to the internal phase of the circular protrusion 28 and the circular arc protrusion 48, which allows the second connector B to be safely and temporarily fixed to prevent it from floating on the first connector A.

Thereafter, from the inside of the above-described first connector A, a bolt 200 is successively inserted to the coupling holes 24, 44 of the first connector A and the coupling hole 114 of the second connector B to be assembled with a screw.

Then, the bolt 200 is rotated with ease by means of the expanded holes 24a, 44a of the first connector A, and it is assembled with a screw to the helical coil 116 built in the coupling hole 114 of the second connector B to maintain a strong assembly power of screw.

After having the first connector A connected to the second connector B as described in the above, if the opening of the support member 140 from the lamp support part 132 of the second connector B is inserted to face the base 110 and gets the bolt 138 assembled with screws to the screw bore 132a of the lamp support part 132, one phase of the bold 138 is pressed to the external phase of the support member 140 to fix the support member 140 by having it separated from the internal phase of the lamp support part 132.

Thereafter, a plurality of truss members are connected as joint members 300 to the connecting part 134 of the second connector B as jointed in the above, but in this preferred embodiment, the truss members are illustrated as those with acryl case 402 where a light means is installed. The acryl case 402 of the truss members 400 is safely arranged on the support member 140 fixed in the lamp support part 132.

In addition, the plugs and electric wires of the light means to be installed in the acryl case 402 of the truss members 400 are wired through the cutting part 144 of the support member 140, and the heat from the light means is radiated to the outside through a lot of radiator 142 to prevent the temperature in the acryl case 402 from rising in advance.

On the other hand, one phase of the joint member 300 to connect the second connector B with the truss members 400 is inserted and fixed to the connecting part 134 of the second connector B, and the other phase is inserted and fixed to the connecting rod 404 of the truss members 400.

In other word, in the joint members whose two ends are inserted to the connecting part 134 of the second connector B and the connecting rod 404 of the truss members 400, both caps 300a, 300b consisting of joint member 300 in accordance with the tightening of a joint bolt 304 assembled with a screw in the center of the cap 300a in one side get wider and expanded, and the holding grooves 302 created in the external surface of both caps 300a, 300b are held and locked to the holding protrusion 136 in the connection part 134 and the holding protrusion 406 in the connecting rod 404.

In addition, when disassembling the joint member 300 as fixed in the above, the adjusting bolt 304 should be untightened by having it rotated contrariwise. Then both caps 300a, 300b of the joint member 300 get narrower, and the diameter of the joint member 300 gets reduced, and thereby the holding grooves 302 from both caps 300a, 300b are removed from the holding protrusion 136 in the connection part 134 and the holding protrusion 406 in the connecting rod 404, which make them possible to be separated.

Therefore, it can achieve various types of prefabricated structures as it is possible to connect successively and joint different kinds of truss members by means of the first connector A and the second connector B to be jointed as described in the above.

And it is possible to install light means as the support member 140 is not arranged on the lamp support part 132 of the second connector B installed as described in the above.

Figure 11:
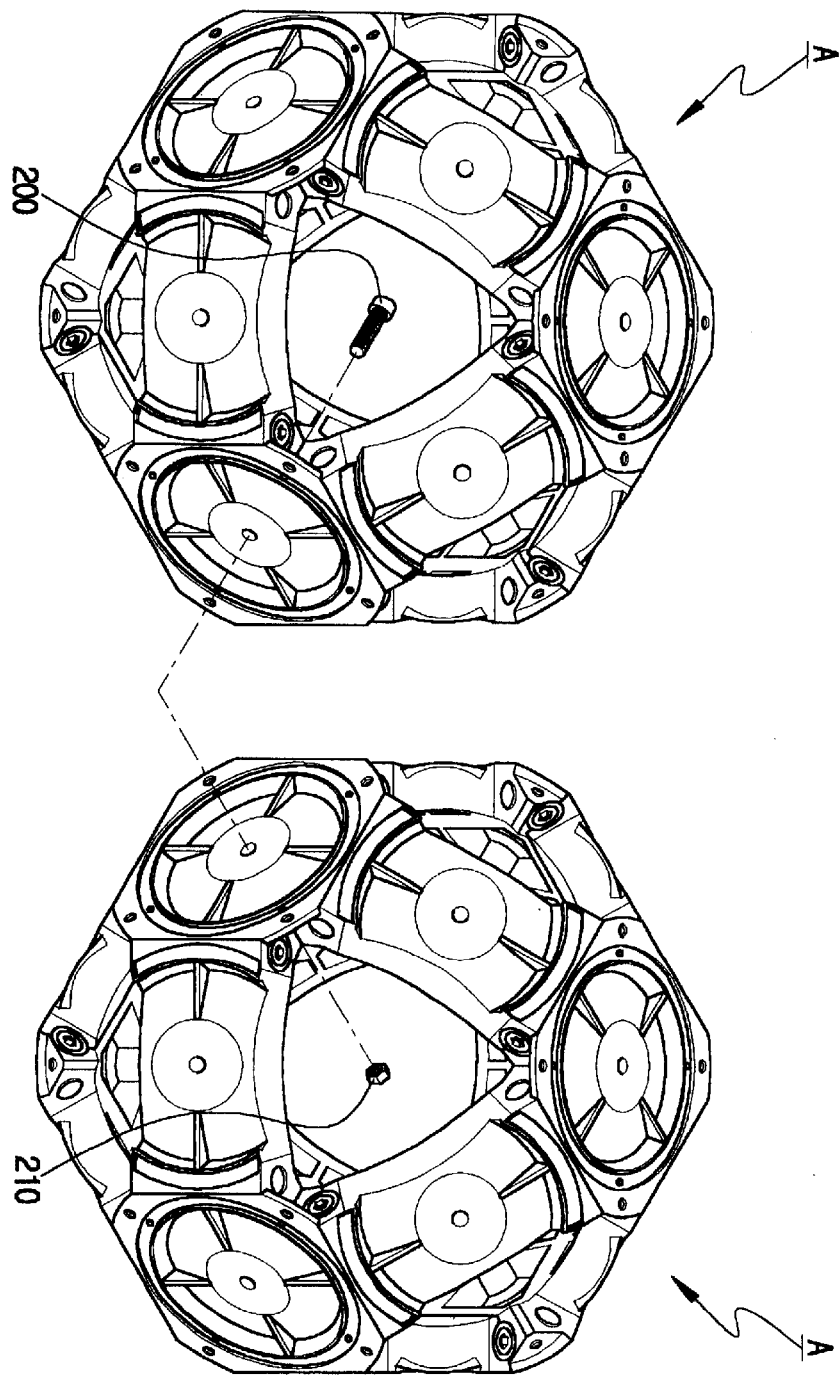
FIG. 11 is a separation view illustrating the coupled state between the first connector in accordance with the present invention.

In addition, the first connector A, as illustrated in FIG. 11, is arranged to connect with the first connector A themselves. At this time, a bolt 200 is inserted into the expanded hole of the first connector in one side, and a nut 210 is inserted and fixed not to rotate in the expanded hole 24a of the first connector in the opposite side. So the first connectors A in both sides are easily jointed and fixed.

On the other hand, in the prefabricated structures established as described in the above, it is possible to establish various types of structures through six central connecting part of the first connector A and twelve tetrahedral connecting part 40 steep at 45 degrees.

And when establishing structures as described in the above, it is possible to insert a worker's hands, tools or light bulbs into the first connector A by means of a curved unit 40a of the tetrahedral connecting part 40, which allows various structures to be established and enhances its workability as well.

On the other hand, when installing finished members of partitions such as glasses or acryl plates on the structure after completing a frame of the structure through the work as described in the above, the finished member should be bolted to the finishing tab hole 34 created on the central connecting part 20 of the first connector A, which makes the structure completed.

As described in the above, a connector for prefabricated structures of the present invention shows advantages for freely establishing structures by connecting successively a plurality of truss members equipped with different kinds at various angles through six central connecting parts, the first connector consisting of twelve tetrahedral connecting parts and the second connector connected to it.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A connector for prefabricated structures, comprising:
   (a) a first connector with six unit members vertically jointed one another to have eighteen jointed surfaces, comprising
      a central connecting part, including a first boss part with a first coupling hole protruded in a side and a hinge part with screw holes in both ends created; a tetrahedral connecting part where the hinge part of the central connecting part and the both ends in the other side of the central connecting part are created in a unit steep at predetermined angles; the second boss part with the second coupling hole formed as protruded in a center of the tetrahedral connecting part to the same direction with the first boss part of the central connecting parts; a plural hinge parts with insertion holes where bolts are inserted are separated in one end to be arranged in both sides of the hinge part of the central connecting part; and
   (b) a second connector, comprising:
      a base including a coupling part formed as protruded in a center of the one side of the coupling part, having a third coupling hole pierced to correspond to the second coupling part of the first connector in the center of the coupling part; a plurality of the seating part formed as protruded by being separated at equal intervals in the external surface of the coupling part; a projected part formed as protruded to the direction of the circular cylinder higher than the coupling part and the seating part in one side of the seating part; a plurality of recesses formed at equal intervals on the projected part;
      a support rod formed steep toward the outside on the other surface of the base at equal intervals;
      a connecting part with a holding protrusion to be held with insertion of the joint members by being formed in a unit on the external phase of one end of the support rod; and
      a lamp support part for supporting a light means by having the external surface of the lamp support part formed in a unit to be close to an internal surface in one end of each support rod.

2. The connector for prefabricated structures according to claim 1, wherein a plurality of bead parts are formed for the second connector to be fixed on the first connector by being inserted to the recess of the second connector for reinforcing rigidity of unit members, in the external surface of the second boss part and the connecting part opposite to the boss part formed on the central connecting part and the tetrahedral connecting part on the first connector.

3. The connector for prefabricated structures according to claim 2, wherein a circular protrusion and a circular arc protrusion are formed in the external ends of the bead parts formed the central connecting part and the tetrahedral connecting part opposite to the boss part of the first connector to reinforce rigidity of the unit members along with the bead parts and to prevent the second connector from floating by having the projected part close to the internal surface after the seating part of the second connector is seated.

4. The connector for prefabricated structures according to claim 1, wherein a finishing tab hole is formed for bolting and installing finished materials in the corner of the central connecting part of the first connector.

5. The connector for prefabricated structures according to claim 1, wherein an expanded hole is formed in one end of the coupling hole of the boss part close to the center of the first connector and in the external end of the insertion hole of the hinge part formed in the tetrahedral connecting part to occupy the inner space of the first connector as much as possible by accepting the round head of a bolt.

6. The connector for prefabricated structures according to claim 5, wherein an expanded hole in the central connecting part is formed into a polygon for a round head of the bolt to be inserted to be able to rotate and a nut to be inserted not to be able to rotate.

7. The connector for prefabricated structures according to claim 1, wherein both ends of the tetrahedral connecting part are created as curved units for workers' hands or tools to easily reach inside the first connector after being gently curved and caved to the boss part in the center.

8. The connector for prefabricated structures according to claim 1, wherein the coupling hole of the second connector is equipped with a helical coil to maintain a strong assembly power of screw when assembling a bolt.

9. The connector for prefabricated structures according to claim 1, wherein the lamp support part of the second connector comprises bolts for being assembled with screws, after being inserted to be separated from the internal surface of the lamp support part, and support members wit one of its phases open.

10. The connector for prefabricated structures according to claim 9, wherein a plurality of radiators in one side of the support members, formed as bored to radiate heat from the light means.

11. The connector for prefabricated structures according to claim 10, wherein a cutting part in one side of the support members, cut from the radiator in one side to one end of the support members.

* * * * *